(12) United States Patent
Geranio et al.

(10) Patent No.: US 6,457,670 B1
(45) Date of Patent: Oct. 1, 2002

(54) COUNTER ROTATING DUCTED FAN FLYING VEHICLE

(75) Inventors: Nick Geranio, Calabasas, CA (US); Robert K. McBride, Las Vegas, NV (US)

(73) Assignee: Roadable Aircraft Int'l, Camarillo, CA (US)

( * ) Notice: Subject to any disclaimer, the term of this patent is extended or adjusted under 35 U.S.C. 154(b) by 0 days.

(21) Appl. No.: 09/820,528

(22) Filed: Mar. 30, 2001

Related U.S. Application Data

(60) Provisional application No. 60/264,699, filed on Jan. 30, 2001.

(51) Int. Cl.[7] .................................................. B64C 37/02
(52) U.S. Cl. ........................ 244/2; 244/23 A; 244/23 C; 244/17.23; 244/23 D
(58) Field of Search .......................... 244/2, 17.11, 23 C, 244/23 A, 17.23, 23 D

(56) References Cited

U.S. PATENT DOCUMENTS

| 4,469,294 A | 9/1984 | Clifton ........................ 244/12.3 |
|---|---|---|
| 4,804,155 A | 2/1989 | Strumbos ..................... 244/12.6 |
| 4,828,203 A | 5/1989 | Clifton et al. .............. 244/12.3 |
| 5,115,996 A | 5/1992 | Moller ......................... 244/12.5 |
| 5,351,913 A | * 10/1994 | Cycon et al. ............... 244/23 C |
| 5,575,438 A | 11/1996 | McGonigle et al. ........... 244/13 |
| 5,746,390 A | * 5/1998 | Chiappetta ................. 244/23 C |
| 5,765,783 A | 6/1998 | Albion ......................... 244/7 B |
| 6,086,015 A | 7/2000 | MacCready, Jr. ............ 244/7 B |
| 6,086,016 A | 7/2000 | Meek ........................ 244/17.11 |

* cited by examiner

Primary Examiner—J. Woodrow Eldred

(57) ABSTRACT

A flying vehicle having a pair of counter rotating propeller blades which provide lift for the vehicle when the vehicle is in a flight mode of operation. The counter rotating blades have in flight adjustable pitch and are connected to a control and steering system in the cockpit of the vehicle. A gas turbine engine located in the aft section of the vehicle is connected through a drive shaft and transmission to the counter rotating propeller blades When the vehicle transitions to the flight mode, the user has aircraft controls available in the cockpit to make the transitions from a driver to a pilot in a short time period. Yaw pedals located on the floor board of the cockpit as well as a pitch control handle and the steering wheel allow the user to steer and control the altitude of the vehicle when the vehicle is in the flight mode.

18 Claims, 9 Drawing Sheets

COUNTER ROTATING DUCTED FAN FLYING VEHICLE

This application claims the benefit of U.S. Provisional Application No. 60/264,699, filed Jan. 30, 2001.

BACKGROUND OF THE INVENTION

1. Field of the Invention

This invention relates to a vehicle that can be driven on the road and without the transition to mechanical wings take off vertically, fly at aircraft altitudes to a destination and then land at the destination.

2. Description of the Prior Art

There is currently no practical means of driving and flying from congested cities to the suburbs or to business meeting. Helicopters cannot be used for street and highway based transportation, that is transport of individuals using city streets and highways. While great for flying to a particular destination, helicopters require the user to also have a car.

Other roadable aircraft that have been developed through the years require the use of a runway and an airport. This is a huge disadvantage with respect to the practicality of this type of vehicle. With "gate hold" procedures being used at most major airports, a take off and landing must be booked well in advance, which further limits the use of these Roadable Aircraft as a means for traveling between destinations.

Accordingly, there is a need for a vehicle which is adapted for use on city streets and the highway and also has vertical takeoff and landing capabilities which will allow the user to travel between destinations at aircraft altitudes.

SUMMARY OF THE INVENTION

The present invention overcomes some of the difficulties encountered in the past including those mentioned in that it comprises a highly efficient and effective counter rotating ducted fan flying vehicle which can be driven on the road and without the transition to mechanical wings take off vertically, fly at aircraft altitudes to a destination and then land at the destination.

The flying vehicle comprising the present invention includes a pair of counter rotating propeller blades which are internal to the vehicle and which provide lift for the vehicle when the vehicle is in a flight mode of operation. The cruising altitude for vehicle is from about 1000 feet to about 20,000 feet.

The counter rotating blades have in flight adjustable pitch and are connected to a control and steering system in the cockpit of the flying vehicle. A gas turbine engine located in the aft section of the flying vehicle is connected through a drive shaft and transmission to the counter rotating propeller blades The shaft output speed of the gas turbine engine is about 6000 revolutions per minute and is reduced to between 1400 rpm and 1800 rpm through the transmission depending on the desired air speed of the flying vehicle.

When the flying vehicle transitions to a flight mode of operation, the user has aircraft controls available in the cockpit to make the transitions from an automobile driver to a helicopter pilot in an extremely short period of time. Yaw pedals located on the floor board of cockpit as well as a collective pitch control handle and the steering wheel allow the user to steer and control the altitude of the flying vehicle when the flying vehicle is in the flight mode of operation.

DESCRIPTION OF A PREFERRED EMBODIMENT

Figure 1:
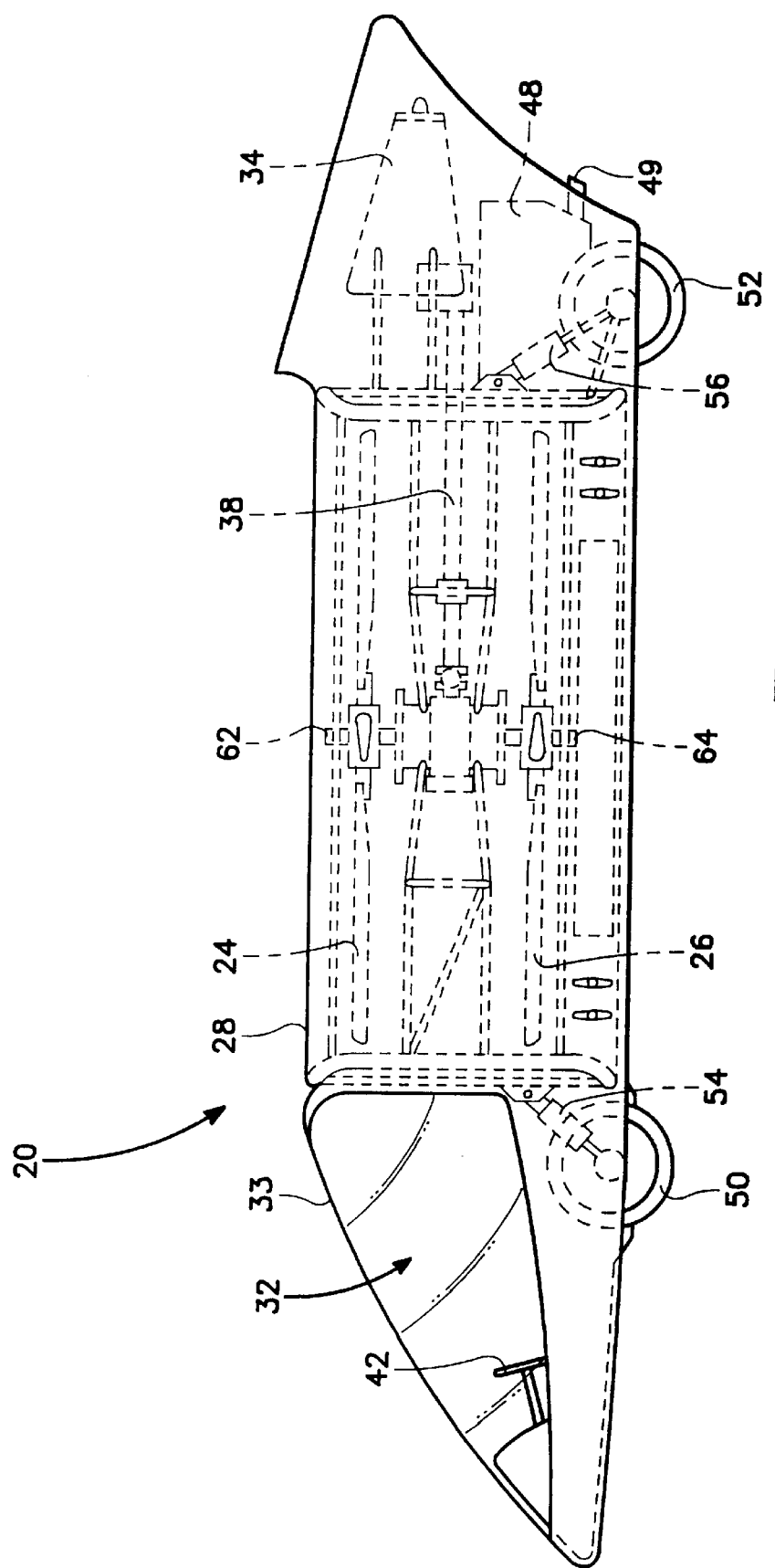
FIG. 1 is a side view of the counter rotating ducted fan flying car constituting a preferred embodiment of the present invention.
Figure 2:
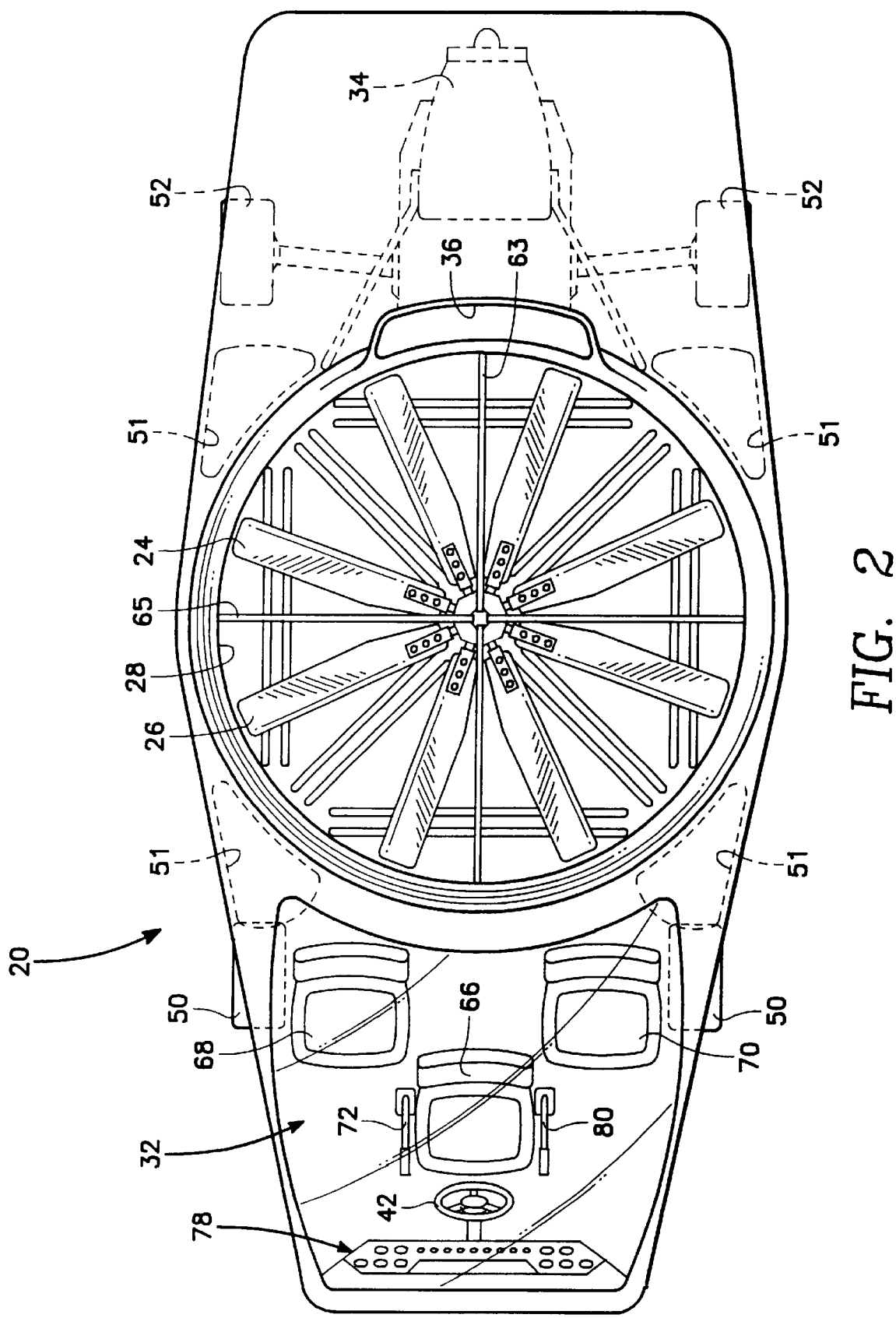
FIG. 2 is a top view of the counter rotating ducted fan flying car of FIG. 1.

Referring to FIGS. 1 and 2, there is shown a counter rotating ducted fan flying vehicle/car 20 constituting the present invention. Vehicle 20 allows a user to drive vehicle 20 on a roadway, highway and city street and also to take off vertically from the roadway and fly to the user's destination. While flying vehicle 20 will still require permitted landing and take of locations, once in the air vehicle 20 will fly like an aircraft and follow standard FAA rules and regulations for aircraft such as helicopters propeller driven aircraft and jet engine aircraft.

Vehicle 20 is designed for use on roadways, city and side streets and freeways and meets the legal requirements for use of these roadways. For flight, vehicle 20 has a pair of counter rotating propeller blades/fans 24 and 26 to provide lift when vehicle 20 is in flight between ground destinations. Rotating propeller blades/fans 24 and 26 are internal to vehicle 20 and thus are not exposed to external elements within the atmosphere. The cruising altitude for vehicle/car 20 is from about 1000 feet to about 20,000 feet.

Figure 3:
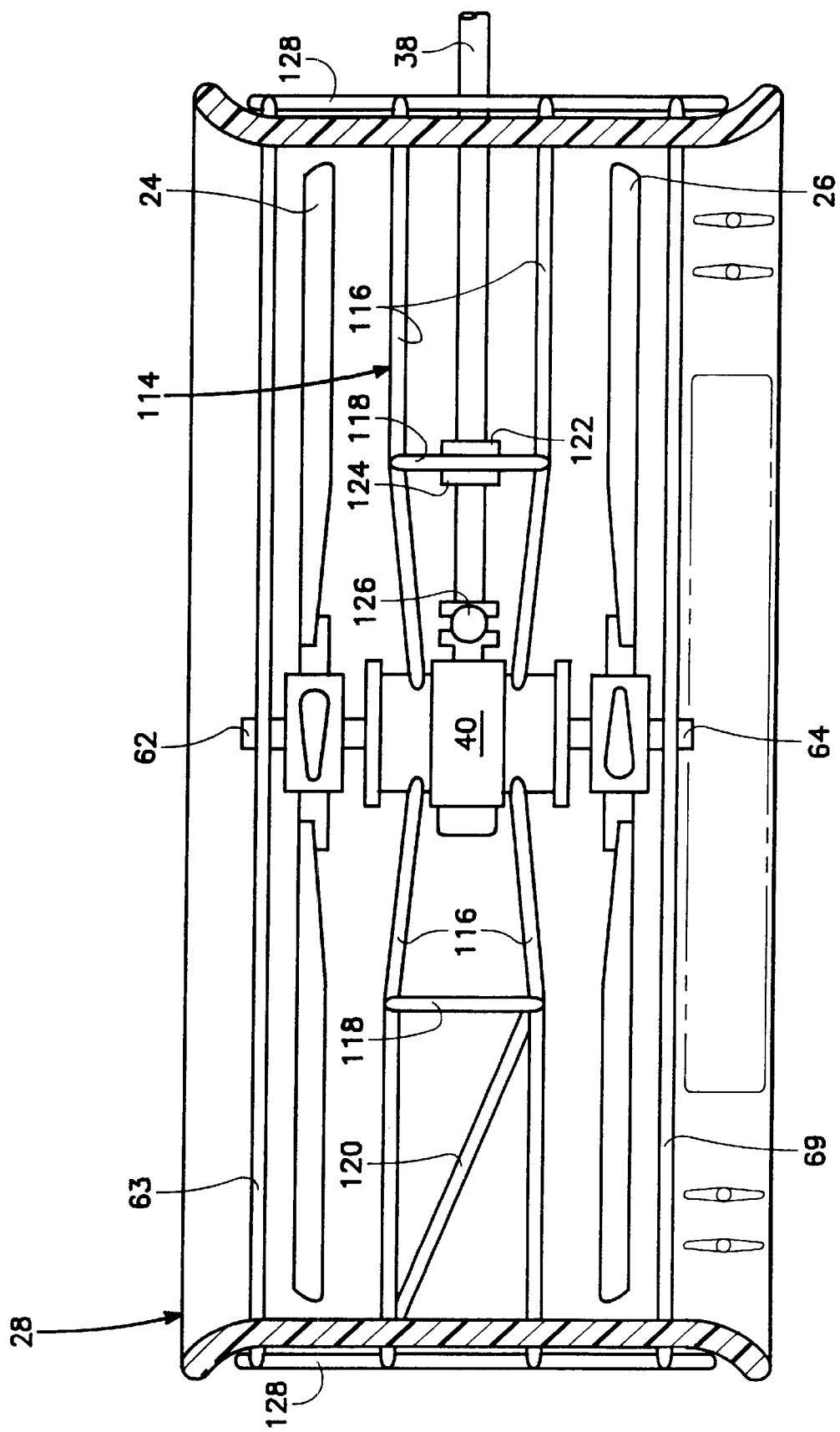
FIG. 3 is a sectional view of the duct housing for the counter rotating blades of the flying car of FIG. 1.

Referring to FIGS. 1, 2 and 3, the pair of counter rotating blades 24 and 26 for vehicle 20 are located in a duct housing 28 (FIG. 3). Counter rotating blades 24 and 26 are approximately 7'8" in length which allows blades 24 and 26 to fit on a highway when vehicle is traveling on the highway. The duct housing 28 for car 20 is fabricated a composite construction aluminum honeycomb carbon fiber. The total width of vehicle 20 is within the 104 inch width limitation of most highways and other roadways. The overall length of vehicle 20 can range from about 16 to about 22 feet depending on the model of vehicle 20 being utilized by a user of vehicle 20.

The counter rotating blades 24 and 26 of vehicle 20 have in flight adjustable pitch similar to that of the propeller blades of a helicopter. Counter rotating blades 24 and 26 are connected to a control and steering system located in the cockpit 32 of flying vehicle 20. Vehicle/car 20 also has a gas turbine engine 34 in the aft section of flying car 20. The turbine air intake 36 for gas turbine engine 34 is also located in the aft section of flying vehicle 20 behind the duct housing 28. The shaft output speed of the gas turbine engine 34 is approximately 6000 revolutions per minute (RPM) at the maximum air speed of vehicle 20. A drive shaft 38 is coupled to and extends from the gas turbine engine 34 into a counter rotating transmission 40 located in the duct housing 28 of vehicle 20. The gas turbine engine 34, drive shaft 38 and counter rotating transmission 40 comprise the blade drive system for counter rotating blades 24 and 26.

A pair of propeller blade drive shafts 62 and 64 extend vertically outward from the counter rotating transmission 40 and couple the transmission 40 to the two counter rotating blades 24 and 26. The counter rotating transmission 40 reduces the revolutions per minute from about 6000 rpm (output by gas turbine engine 34) to the 1800 rpm at which blades 24 and 26 rotate when flying vehicle car 20 is operating at maximum air speed. When flying vehicle 20 is in the flight mode of operation, blades 24 and 26 can rotate in a range of from approximately 1400 rpm to approximately 1800 rpm depending upon the user's desired air speed during flight from one destination to another.

Figure 4:
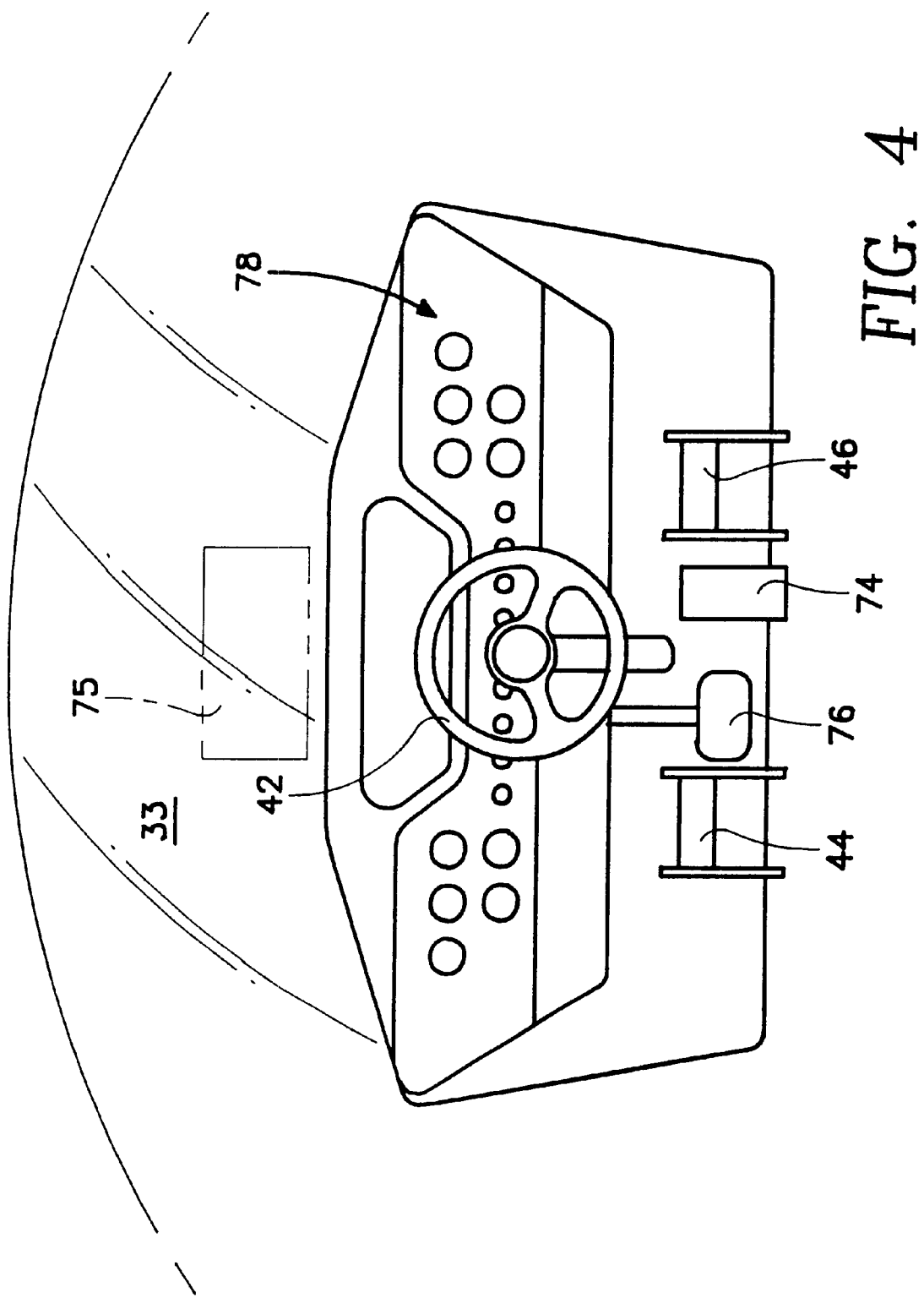
FIG. 4 is view illustrated the cockpit instrument panel, steering wheel and related control elements the flying car of FIG. 1 which allow a user to fly and also drive flying vehicle.

Referring to FIGS. 1, 2 and 4, the cockpit 32 for vehicle 20 is located in front of the duct housing 28 of flying vehicle/car 20 and can accommodate from one to three passengers, with one passenger being seated in a driver seat 66 and the remaining passengers being seated in passenger seats 68 and 70. Cockpit 32 has a cockpit windshield 33 which allows the driver/pilot of flying vehicle 20 to observe the roadway and the air space ahead of vehicle 20. Cockpit windshield has a heads up display 75 for use by the driver/pilot of vehicle 20 when vehicle 20 is in a flight mode of operation.

The control and steering system of flying vehicle 20 is also located within the cockpit 32 of flying vehicle 20. The control and steering system provides a means for the user to control the air speed, altitude and steer flying vehicle 20 when flying vehicle 20 is in a flight mode of operation and also provides a means for controlling the speed of and steering flying vehicle 20 when flying vehicle 20 is a ground travel mode of operation.

The control and steering system includes a steering wheel 42 which allows a user of flying vehicle 20 to steer flying vehicle 20 on a highway or other roadway; a gas pedal 74 for controlling the speed of the flying vehicle 20 while on the roadway and a brake pedal 76 for bringing the flying vehicle 20 to a complete stop while a driver is driving vehicle 20 on the roadway. There is also a hand brake handle 72 located on the right side of the driver seat 66 which the driver uses to set an emergency brake when flying vehicle 20 is in park. The instrument panel 78 for flying vehicle 20 is also located in the cockpit 32 of flying vehicle 20. The instrument panel 78 includes a ground travel mileage indicator, a fuel indicator, an electrical charge indicator, a speed indicator in miles per hour, an RPM indicator, a brake light indicator as well as a engine overheat indicator and other indicators generally found in automobiles.

When flying car 20 transitions to a flying mode of operation, the user has helicopter type controls available in the cockpit 32 to make the transitions from an automobile driver to a helicopter/aircraft pilot in an extremely short period. Yaw pedals 44 and 46 located on the floor board of cockpit 32 as well as steering wheel 42 and a collective pitch control handle 80 allow the user to steer and control the altitude of flying car 20 when flying car 20 is in the flying mode of operation. Specifically, the left yaw pedal 44 allows the user to execute a left turn of flying vehicle 20 and the right yaw pedal 46 allows the user to execute a right turn of flying vehicle 20. Steering wheel 42 is used to control forward and backward motion of flying vehicle 20 as well as left sideways motion and right sideways motion of flying vehicle 20.

The cockpit instrument panel 78 is generally the same as the instrumentation panel of a helicopter. Instrument panel 78 includes aircraft engine instrumentation/flight instrumentation indicators such as an altimeter, vertical speed indicator, airspeed indicator, artificial horizon indicator, and other normal aircraft flight instrumentation indicators are included within cockpit instrument panel 78.

Flying vehicle 20 has two engines, gas turbine engine 34 which is the power source when flying vehicle/car 20 is in a flight mode of operation and a gasoline engine 48 which is utilized when flying car 20 is traveling on a highway or other roadway. Attached to gasoline engine 48 is a muffler and exhaust pipe 49 for venting engine exhaust. Gas turbine engine 34 may have a capacity rating of from about 300 hp to about 30,000 hp with the higher horsepower engine being used in military type vehicles and the lower horsepower engine being used in commercial vehicles. The four fuel tanks 51 which store fuel for the gasoline engine 48 and the gas turbine engine 34 are arranged symmetrically about duct housing 28 in the manner illustrated in FIG. 2. The arrangement of the fuel tanks 51 within vehicle 20 is for balancing the fuel load within vehicle 20.

Gas turbine engine 34 through drive shaft 38 and transmission drives the counter rotating blades/fans 24 and 26 when flying vehicle 20 is in a flight mode of operation.

The gasoline engine 48 is a small light weight engine with a transmission coupled to the rear axle of flying vehicle/car 20. Gasoline engine 48 is the means for powering the flying vehicle 20 on a street or on a highway. The gasoline engine provides sufficient power to allow flying car 20 to travel at speeds of up to 70 mph which is generally the highest allowable speed on most highways. The gasoline engine 48 is also equipped with smog control equipment which flying vehicle 20 must have when driven in areas with strict smog control requirements.

The front and rear wheels 50 and 52 have independent shock suspensions 54 and 56 and the front wheels 50 of vehicle 20 are steerable while vehicle 20 is on a roadway using steering wheel 42 which is located in the cockpit 32 of flying vehicle 20.

Air flow is from the top of flying car 20 through the duct housing 28 of flying car 20 exiting through the control vanes of vehicle 20 located below counter rotating propeller blades/fans 24 and 26.

Figure 5:
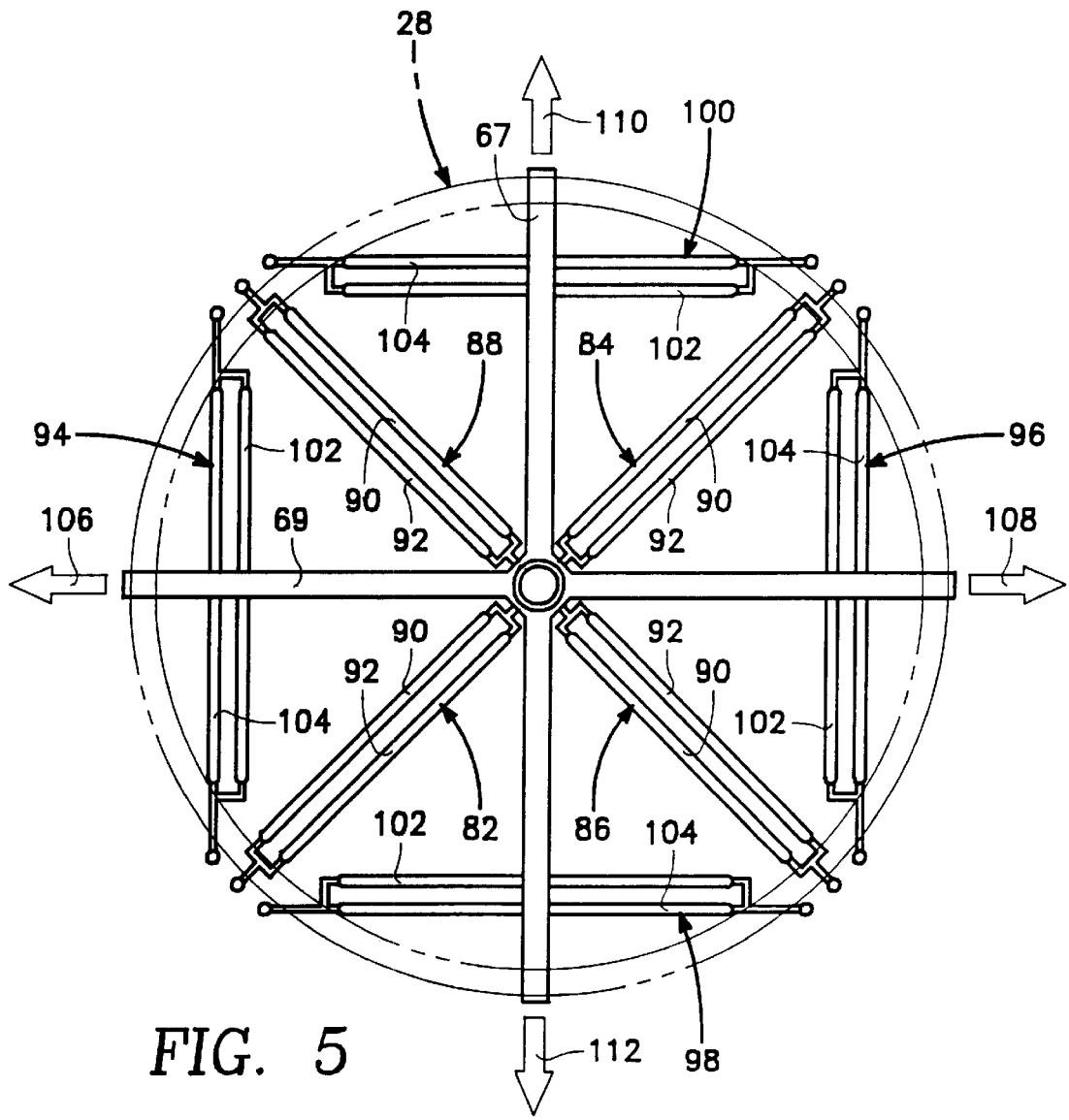
FIG. 5 is an overhead view illustrating an arrangement of the control vanes used to steer the flying vehicle of FIG. 1 when the vehicle is in a flight mode of operation.

Referring to FIG. 5, the flying vehicle 20 has four angled direction control vane assemblies 82, 84, 86 and 88. Each angled direction control vane assemblies 82, 84, 86 and 88 comprises a pair of identical elongated direction control vanes 90 and 92 which are parallel to one another. The angled direction control vane assemblies 82, 84, 86 and 88 allow the user of vehicle 20 to execute left and right turns, that is the user of vehicle 20 may turn vehicle 20 in a new direction, either to the left or to the right.

Flying vehicle 20 also has first and second forward/reverse direction control vane assemblies 94 and 96 and first and second sideways direction control vane assemblies 98 and 100. Each forward/reverse direction control vane assembly 94 and 96 and each sideways direction control vane assembly 98 and 100 has a pair of identical elongated direction control vanes 102 and 104 which are parallel to one another. The forward/reverse direction control vane assemblies 94 and 96 allow the user of vehicle 20 to control movement of vehicle 20 in the forward direction (as indicated by arrow 106) and the reverse direction (as indicated by arrow 108). In a similar manner, the sideways direction control vane assemblies 98 and 100 allow the user of vehicle 20 to control movement of vehicle 20 by sliding sideways to the right (as indicated by arrow 110) and by sliding sideways to the left (as indicated by arrow 112).

Referring to FIGS. 3 and 5, the counter rotating propeller blades/fans 24 and 26 are positioned within duct housing 28 in the manner illustrated in FIG. 3. The duct housing 28 for vehicle 20 includes a transmission support structure 114. Support structure 114 provides the support means for blades 24 and 26 as well as the counter rotating transmission 40 and drive shaft 38. Support structure 114 comprises a plurality of horizontal support struts 116. Each support strut 114 has one end angle inward and attach to transmission 40 and the other end extend through duct housing 28 and attach to a support member 128 positioned vertically outside of duct housing 28. Support structure also has a plurality of vertical support struts 118 and a plurality of angled support struts 120. Each vertical support strut 118 and angled support strut 120 is positioned between adjacent horizontal support struts in the manner illustrated in FIG. 3. It should be noted that the vertical strut 118 located on the right side of support structure 114 has a drive shaft support member 122 with an opening 124 through which drive shaft 38 passes. The opening 124 of support member 122 include roller/antifriction bearings to insure frictionless rotation drive shaft 38. A universal joint 126 is also provided to couple drive shaft 38 to transmission 40.

Figure 6:
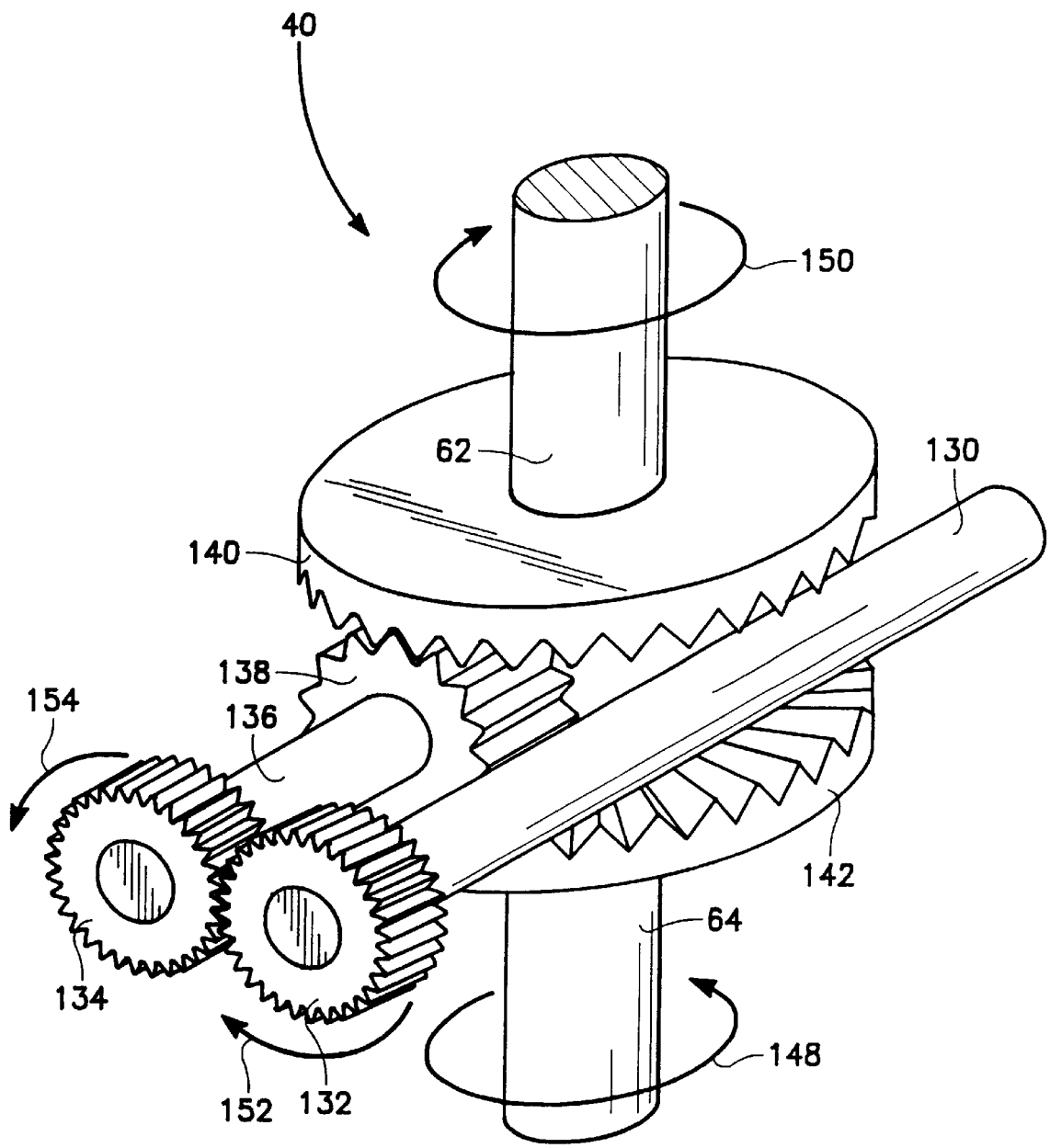
FIG. 6 is a perspective view illustrating the internal components of the counter rotating transmission used by flying vehicle of FIG. 1.

Referring to FIGS. 2 and 6, FIG. 6 illustrates the internal components of the counter rotating transmission 40 used by flying vehicle/car 20. One end of a transmission shaft 130 located within the housing for transmission 40 is connected to drive shaft 38 by universal joint 126. The opposite end of shaft 130 has a ratio gear 132 attached thereto. Aligned with ratio gear 132 is a ratio gear 134 with the teeth of ratio gear 134 being in rotatable engagement with the teeth of ratio gear 132. Ratio gear 134 is attached to one end of a transmission shaft 136 with the opposite end of shaft 136 having a pinion gear 138 attached thereto. Pinion gear 136 is sandwiched between a pair of ring gears 140 and 142. The teeth of ring gears 140 and 142 are rotatable engagement with the teeth of pinion gear 138 as shown in FIG. 6. The end of propeller blade drive shaft 62 positioned within transmission 40 is attached to ring gear 140, while the end of propeller blade drive shaft 64 positioned within transmission 40 is attached to ring gear 142. The opposite end of propeller blade drive shaft 62 is in rotatable engagement with a pair of upper bearing housing support members 63 and 65 (FIG. 2) which are perpendicular to one another and which provide support for drive shaft 62 as well as propeller blade 24. Similarly, the opposite end of propeller blade drive shaft 64 is in rotatable engagement with a pair of lower bearing housing support members 67 and 69 (FIG. 5) which are perpendicular to one another and which provide support for drive shaft 64 as well as propeller blade 26.

As shown in FIGS. 1 and 6, when shaft 130 and ratio gear 132 rotate in the clockwise direction (as indicated by arrow 152), shaft 136, ratio gear 134 and pinion gear 138 will rotate in the counterclockwise direction (as indicated by arrow 154). Rotation of pinion gear 138 in the counterclockwise direction will result in ring gear 140, drive shaft 62 and propeller blade 24 rotating in the clockwise direction (as indicated by arrow 150) and ring gear 142, drive shaft 64 and propeller blade 26 rotating in the counterclockwise direction (as indicated by arrow 148).

Referring to FIGS. 1, 7, 8 and 9, vertical lift for flying vehicle 20 when in a flight mode of operation is provided in manner that is similar to that of helicopter. As with a helicopter, air velocity is produced by rotation of the propeller blades 24 and 26, when the angle of attach attains a certain value, the vertical lift developed by vehicle 20 overcomes the weight of the vehicle 20. Flying vehicle 20 then takes off vertically.

Figure 7:
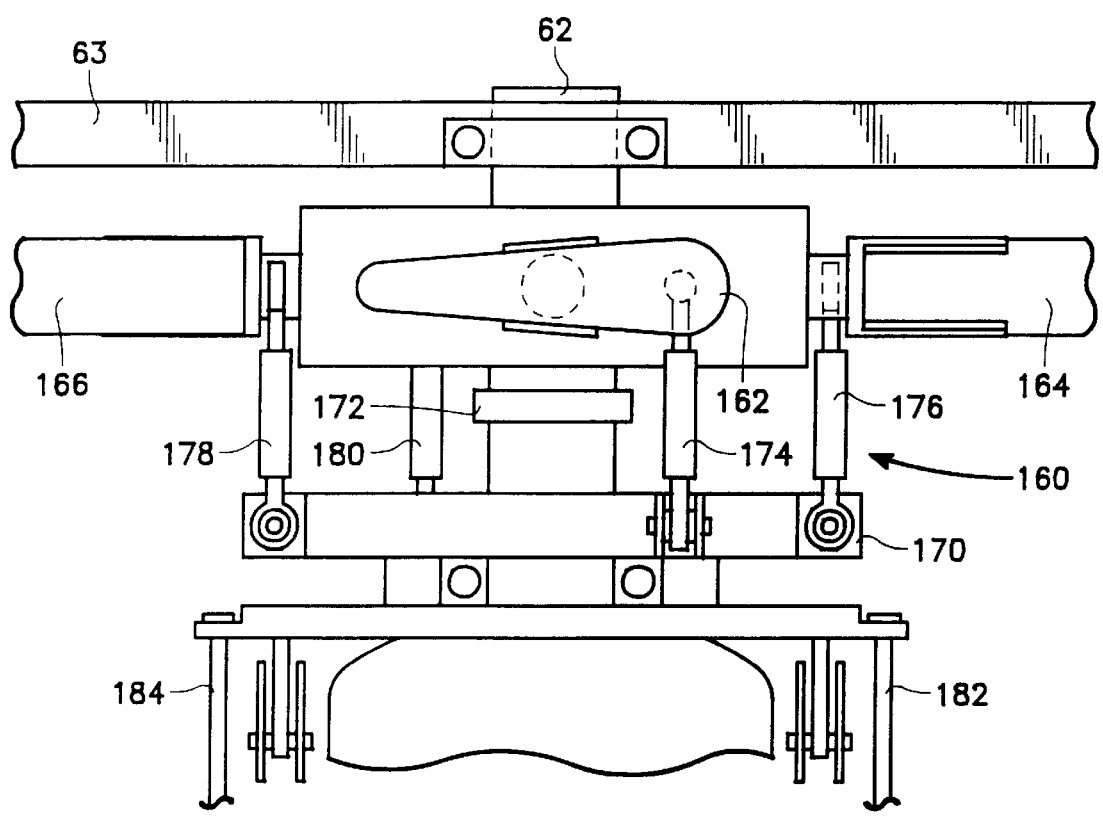
FIGS. 7 and 8 illustrate the pitch control assembly used to rotate the propeller blades of the flying vehicle of FIG. 1.
Figure 8:
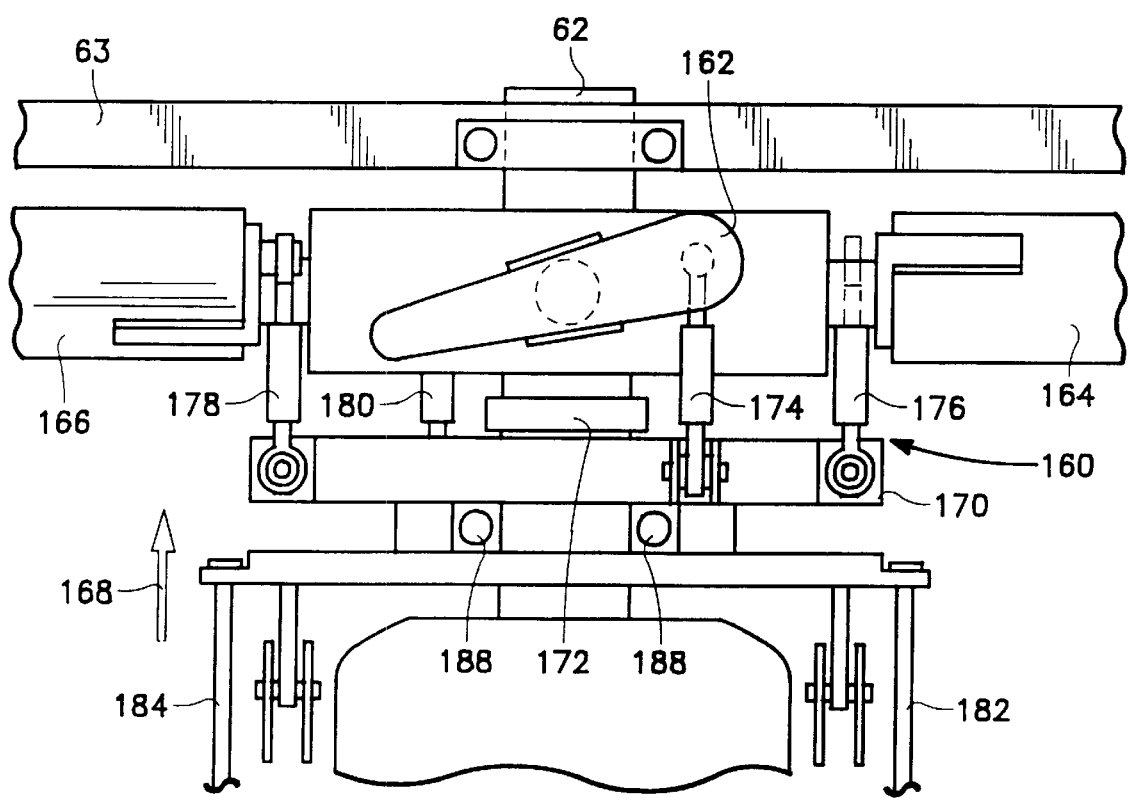

As shown in FIGS. 7 and 8, a rotor pitch control assembly 160 rotates each of four individual blades (only blades 162, 164 and 166 are shown in FIG. 7 and 8) from an essentially horizontal position as shown in FIG. 7 to an angled position as shown in FIG. 8. The rotor pitch control assembly 160 moves upward along shaft 62 (as indicated by arrow 168) until a swash plate 170 engages a swash plate stop 172 in the manner illustrated in FIG. 8. This movement rotates each of the propeller blades 162, 164 and 166 in the counterclockwise direction angling the propeller blades. A pitch link connects each of the propeller blades to the swash plate 170. Specifically, a pitch link 174 connects propeller blade 162 to swash plate 170, a pitch link 176 connects propeller blade 164 to swash plate 170, and a pitch link 178 connects propeller blade 166 to swash plate 170. There is also a pitch link 180 which connects a fourth propeller blade (not illustrated in FIGS. 7 and 8) to the swash plate 170.

Figure 9:
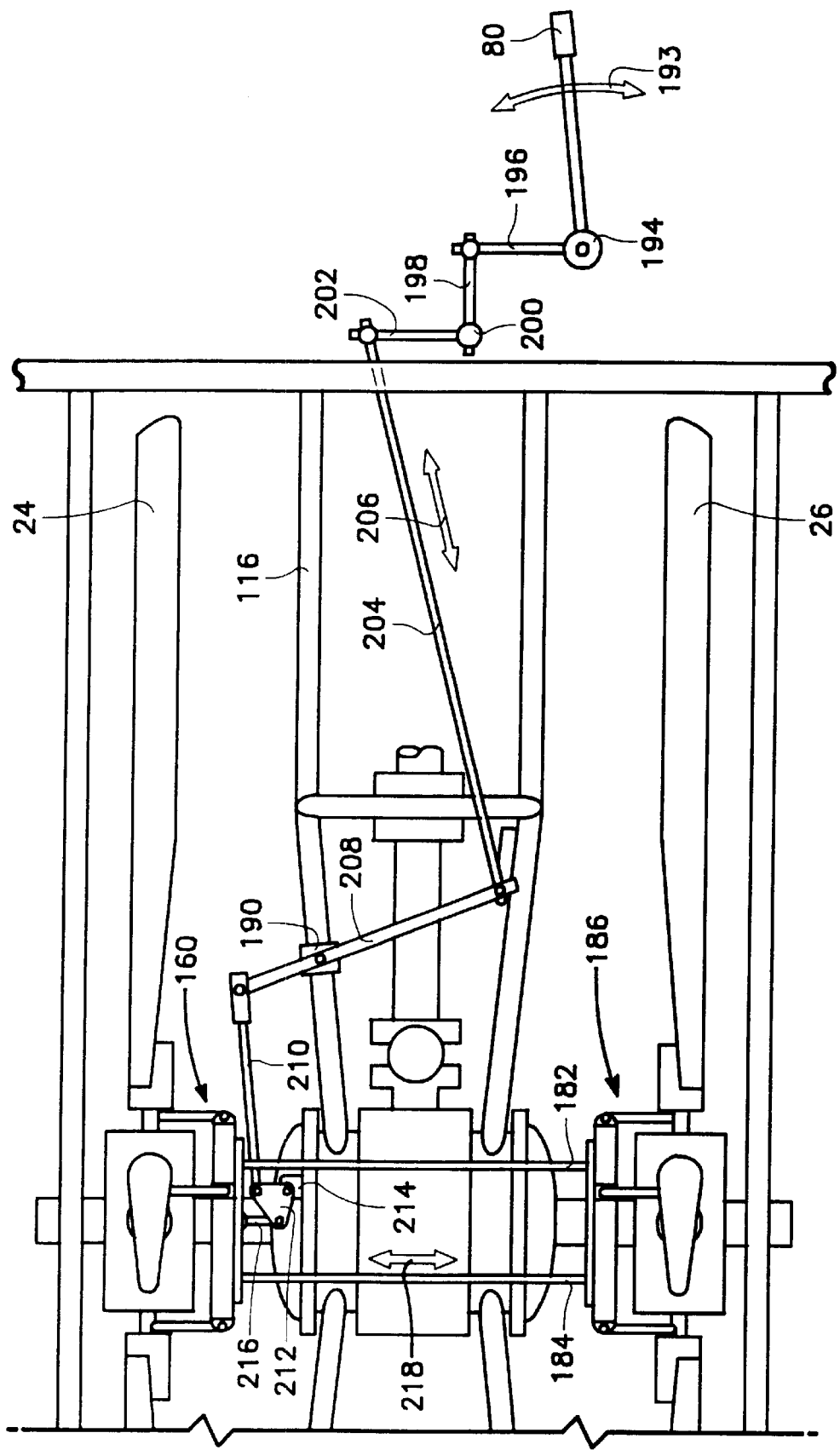
FIG. 9 illustrates the mechanism to control the pitch of the counter rotating propeller blades of the flying vehicle of FIG. 1.

Referring to FIGS. 7, 8 and 9, a plurality of colotor rods 182 and 184 connect the rotor pitch control assembly 160 used to control the pitch of propeller blades 24 to the rotor pitch control assembly 186 used to control the pitch of propeller blades 26. As shown in FIG. 8, bearings 188 are also provided to allow for substantially frictionless movement of swash plate 170 on shaft 62.

Collective pitch control handle 80 moves in the manner indicated by arrow 193 about a pivot 194 to control the pitch of propeller blades 24 and 26. Handle 80 is connected to a control tube 204 by a plurality of linkage arms 196, 198 and 202. A bell crank fulcrum 200 is provided for pivotal movement of arms 198 and 202 which form a bell crank, that is arms 202 and 198 are at a right angle to one another. Movement of handle 193 moves control tube 204 in the manner indicated by arrow 206. Connected to control tube 206 is a linkage arm 208 which pivots about a pivot block 190 attached to horizontal support strut 116 as shown in FIG. 9. A linkage arm 210 connects linkage arm 208 to a triangular shaped plate 212. Triangular shaped plate 212 is rotatably attached to a mount 214. A linkage arm 216 connects plate 214 to the underside of swash plate 170. When a driver/pilot engages collective pitch control handle 80, moving handle 80 in the manner indicated by arrow 193, linkage arm 208 rotates about pivot block 190, which results in rotational movement of triangular shaped plate 212 which raises and lowers colotor rods 182 and 184 in the manner indicated by arrow 218. This motion adjust the pitch of the propeller blades 24 and 26 providing lift for vehicle 20 when the vehicle 20 is in a flight mode of operation.

From the foregoing, it may readily be seen that the present invention comprises a new, unique and exceedingly useful flying vehicle that can be driven on the road and without the transition to mechanical wings take off vertically, fly at aircraft altitudes to a destination and then land at the destination which constitutes a considerable improvement over the known prior art. Many modifications and variations of the present invention are possible in light of the above teachings. It is to be understood that within the scope of the appended claims the invention may be practiced otherwise than as specifically described.

What is claimed is:

1. An aerial vehicle for ground and air transportation comprising:

(a) a vehicle body;
(b) a cylindrical shaped duct housing centrally located within said vehicle body;
(c) a pair of counter rotating propeller blades rotatably mounted within said cylindrical shaped duct housing, a first of said pair of counter rotating propeller blades being positioned within an upper portion of said cylindrical shaped duct housing, a second of said pair of counter rotating propeller blades positioned within a lower portion of said cylindrical shaped duct housing, said pair of counter rotating propeller blades being operative to provide vertical takeoff and landing and translational flight capabilities for said aerial vehicle;
(d) a gas turbine engine mounted within said vehicle body at a rear end of said vehicle body behind said duct housing, said gas turbine engine having a drive shaft which extends from said gas turbine engine into said duct housing;
(e) a counter rotating transmission mounted within said duct housing between said pair of counter rotating propeller blades, said counter rotating transmission including:
  (i) a transmission housing;
  (ii) a transmission shaft which has one end connected to the drive shaft of said gas turbine engine, said transmission shaft having a portion thereof positioned within said transmission housing;
  (iii) a first ratio gear attached to an opposite end of said transmission shaft within said transmission housing;
  (iv) an internal shaft positioned adjacent said transmission shaft, said internal shaft being located within said transmission housing;
  (v) a second ratio gear attached to one end of said internal shaft, said second ratio gear being in rotatable engagement with said first ratio gear;
  (vi) a first propeller blade drive shaft which extends upward from said transmission housing, said first propeller blade drive shaft being connected to the first of said pair of counter rotating propeller blades;
  (vii) a second propeller blade drive shaft which extends downward from said transmission housing, said second propeller blade drive shaft being connected to the second of said pair of counter rotating propeller blades;
  (viii) a first ring gear attached to an opposite end of said first propeller blade drive shaft within said transmission housing;
  (ix) a second ring gear attached to an opposite end of said second propeller blade drive shaft within said transmission housing; and
  (x) a pinion gear attached to an opposite end of said internal shaft, said pinion gear being sandwiched between said first and second ring gears, said pinion gear being in rotatable engagement with said first and second ring gears; and
(f) a plurality of direction control vane assemblies mounted within said cylindrical shaped duct housing at a bottom end of said cylindrical shaped duct housing, said plurality of direction control vane assemblies controlling directional movement of said aerial vehicle is in a flight mode of operation.

2. The aerial vehicle of claim 1 further comprising a rotor pitch control assembly for rotating said pair of counter rotating propeller blades in a counterclockwise direction angling said pair of counter rotating propeller propeller blades, said rotor pitch control assembly including:

a first swash plate slidably mounted on said first propeller blade drive shaft;
a second swash plate slidably mounted on said second propeller blade drive shaft;
each of said first and second swash plates including a plurality of roller bearings which allow for substantially frictionless movement of said first swash plate on said first propeller blade drive shaft and said second swash plate on said second propeller blade drive shaft;
a plurality of colotor rods, each of said colotor rods having one end connected to said first swash plate and an opposite end connected to said second swash plate;
a first plurality of pitch links, each of said first plurality of pitch links having one end connected to said first swash plate and an opposite end connected to the first of said pair of counter rotating propeller blades;
a second plurality of pitch links, each of said second plurality of pitch links having one end connected to said second swash plate and an opposite end connected to the second of said pair of counter rotating propeller blades; and
a collective pitch control handle operatively connected to said rotor pitch control assembly, said collective pitch control assembly allowing a user to control a collective pitch for said pair of counter rotating propeller blades by adjusting said collective pitch control handle which results in synchronous movement of said first swash plate on said first propeller blade drive shaft and said second swash plate on said second propeller blade drive shaft.

3. The aerial vehicle of claim 2 wherein each of said pair of counter rotating propeller blades has four blades.

4. The aerial vehicle of claim 3 wherein said first plurality of pitch links comprises four pitch links, each of the four pitch links of said first plurality of pitch links being connected to one of the four blades of the first of said pair of counter rotating propeller blades and said second plurality of pitch links comprises four pitch links, each of the four pitch links of said second plurality of pitch links being connected to one of the four blades of the second of said pair of counter rotating propeller blades.

5. The vehicle of claim 1 further comprising:
a first wheel and axle assembly positioned at the rear end of said aerial vehicle, said first wheel and axle assembly including first and second drive wheels, the first drive wheel being rotatably mounted on one side of said of aerial vehicle and the second drive wheel being rotatably mounted on an opposite side of said aerial vehicle;
a gasoline engine and transmission assembly operatively connected to said first wheel and axle assembly to provide power to said first and second drive wheels rotating said first and second drive wheels when said aerial vehicle is in a ground based mode of operation;
a second wheel and axle assembly positioned at a front end of said aerial vehicle, said second wheel and axle assembly including first and second steerable wheels, the first steerable wheel being rotatably mounted on the one side of said of aerial vehicle and the second steerable wheel being rotatably mounted on the opposite side of said aerial vehicle; and
a steering wheel mounted within a cockpit located in proximity to the front end of said aerial vehicle, said steering wheel being operatively connected to said second wheel and axle assembly to allow a user of said aerial vehicle to steer said first and second steerable wheels and maneuver said aerial vehicle on a roadway when said aerial vehicle is in said ground based mode of operation.

6. The flying vehicle of claim 5 further comprising first, second, third and fourth shock suspensions attached to said vehicle body, said first shock suspension being connected to said first steerable wheel, said second first shock suspension being connected to said second steerable wheel, said third shock suspension being connected to said first drive wheel, and fourth third shock suspension being connected to said fourth drive wheel.

7. The flying vehicle of claim 1 further comprising a cockpit windshield located in proximity to the front end of said aerial vehicle said cockpit windshield allowing a user of said flying vehicle to observe a roadway and an air space ahead of said flying vehicle, said cockpit windshield including a heads up display.

8. An aerial vehicle for ground and air transportation comprising:

(a) a vehicle body;

(b) a cylindrical shaped duct housing centrally located within said vehicle body;

(c) a pair of counter rotating propeller blades rotatably mounted within said cylindrical shaped duct housing, a first of said pair of counter rotating propeller blades being positioned within an upper portion of said cylindrical shaped duct housing, a second of said pair of counter rotating propeller blades positioned within a lower portion of said cylindrical shaped duct housing, said pair of counter rotating propeller blades being operative to provide vertical takeoff and landing and translational flight capabilities for said aerial vehicle;

(d) a gas turbine engine mounted within said vehicle body at a rear end of said vehicle body behind said duct housing, said gas turbine engine having a drive shaft which extends from said gas turbine engine into said duct housing;

(e) a counter rotating transmission mounted within said duct housing between said pair of counter rotating propeller blades, said counter rotating transmission including:

(i) a transmission housing;

(ii) a transmission shaft which has one end connected to the drive shaft of said gas turbine engine, said transmission shaft having a portion thereof positioned within said transmission housing;

(iii) a first ratio gear attached to an opposite end of said transmission shaft within said transmission housing;

(iv) an internal shaft positioned adjacent said transmission shaft, said internal shaft being located within said transmission housing;

(v) a second ratio gear attached to one end of said internal shaft, said second ratio gear being in rotatable engagement with said first ratio gear;

(vi) a first propeller blade drive shaft which extends upward from said transmission housing, said first propeller blade drive shaft being connected to the first of said pair of counter rotating propeller blades;

(vii) a second propeller blade drive shaft which extends downward from said transmission housing, said second propeller blade drive shaft being connected to the second of said pair of counter rotating propeller blades;

(viii) a first ring gear attached to an opposite end of said first propeller blade drive shaft within said transmission housing;

(ix) a second ring gear attached to an opposite end of said second propeller blade drive shaft within said transmission housing; and (x) a pinion gear attached to an opposite end of said internal shaft, said pinion gear being sandwiched between said first and second ring gears, said pinion gear being in rotatable engagement with said first and second ring gears; and (f) a plurality of direction control vane assemblies mounted within said cylindrical shaped duct housing at a bottom end of said cylindrical shaped duct housing, said plurality of direction control vane assemblies controlling directional movement of said aerial vehicle is in a flight mode of operation;

(g) a first wheel and axle assembly positioned at the rear end of said aerial vehicle, said first wheel and axle assembly including first and second drive wheels, the first drive wheel being rotatably mounted on one side of said of aerial vehicle and the second drive wheel being rotatably mounted on an opposite side of said aerial vehicle;

(h) a gasoline engine and transmission assembly operatively connected to said first wheel and axle assembly to provide power to said first and second drive wheels rotating said first and second drive wheels when said aerial vehicle is in a ground based mode of operation;

(i) a second wheel and axle assembly positioned at a front end of said aerial vehicle, said second wheel and axle assembly including first and second steerable wheels, the first steerable wheel being rotatably,mounted on the one side of said of aerial vehicle and the second steerable wheel being rotatably mounted on the opposite side of said aerial vehicle; and (j) a steering wheel mounted within a cockpit located in proximity to the front end of said aerial vehicle, said steering wheel being operatively connected to said second wheel and axle assembly to allow a user of said aerial vehicle to steer said first and second steerable wheels and maneuver said aerial vehicle on a roadway when said aerial vehicle is in said ground based mode of operation.

9. The aerial vehicle of claim 8 further comprising a rotor pitch control assembly for rotating said pair of counter rotating propeller blades in a counterclockwise direction angling said pair of counter rotating propeller propeller blades, said rotor pitch control assembly including:

a first swash plate slidably mounted on said first propeller blade drive shaft;

a second swash plate slidably mounted on said second propeller blade drive shaft;

each of said first and second swash plates including a plurality of roller bearings which allow for substantially frictionless movement of said first swash plate on said first propeller blade drive shaft and said second swash plate on said second propeller blade drive shaft;

a plurality of colotor rods, each of said colotor rods having one end connected to said first swash plate and an opposite end connected to said second swash plate;

a first plurality of pitch links, each of said first plurality of pitch links having one end connected to said first swash plate and an opposite end connected to the first of said pair of counter rotating propeller blades;

a second plurality of pitch links, each of said second plurality of pitch links having one end connected to said second swash plate and an opposite end connected to the second of said pair of counter rotating propeller blades; and a collective pitch control handle operatively connected to said rotor pitch control assembly, said collective pitch control assembly allowing a user to control a collective pitch for said pair of counter rotating propeller blades by adjusting said collective pitch control handle which results in synchronous movement of said first swash plate on said first propeller blade drive shaft and said second swash plate on said second propeller blade drive shaft.

10. The aerial vehicle of claim 9 wherein each of said pair of counter rotating propeller blades has four blades.

11. The aerial vehicle of claim 10 wherein said first plurality of pitch links comprises four pitch links, each of the four pitch links of said first plurality of pitch links being connected to one of the four blades of the first of said pair of counter rotating propeller blades and said second plurality of pitch links comprises four pitch links, each of the four pitch links of said second plurality of pitch links being connected to one of the four blades of the second of said pair of counter rotating propeller blades.

12. The flying vehicle of claim 8 further comprising first, second, third and fourth shock suspensions attached to said vehicle body, said first shock suspension being connected to said first steerable wheel, said second first shock suspension being connected to said second steerable wheel, said third shock suspension being connected to said first drive wheel, and fourth third shock suspension being connected to said fourth drive wheel.

13. The flying vehicle of claim 8 further comprising a cockpit windshield located in proximity to the front end of said aerial vehicle said cockpit windshield allowing a user of said flying vehicle to observe a roadway and an air space ahead of said flying vehicle, said cockpit windshield including a heads up display.

14. An aerial vehicle for ground and air transportation comprising:
 (a) a vehicle body;
 (b) a cylindrical shaped duct housing centrally located within said vehicle body;
 (c) a pair of counter rotating propeller blades rotatably mounted within said cylindrical shaped duct housing, a first of said pair of counter rotating propeller blades being positioned within an upper portion of said cylindrical shaped duct housing, a second of said pair of counter rotating propeller blades positioned within a lower portion of said cylindrical shaped duct housing, said pair of counter rotating propeller blades being operative to provide vertical takeoff and landing and translational flight capabilities for said aerial vehicle;
 (d) a gas turbine engine mounted within said vehicle body at a rear end of said vehicle body behind said duct housing, said gas turbine engine having a drive shaft which extends from said gas turbine engine into said duct housing;
 (e) a counter rotating transmission mounted within said duct housing between said pair of counter rotating propeller blades, said counter rotating transmission including:
  (i) a transmission housing;
  (ii) a transmission shaft which has one end connected to the drive shaft of said gas turbine engine, said transmission shaft having a portion thereof positioned within said transmission housing;
  (iii) a first ratio gear attached to an opposite end of said transmission shaft within said transmission housing;
  (iv) an internal shaft positioned adjacent said transmission shaft, said internal shaft being located within said transmission housing;
  (v) a second ratio gear attached to one end of said internal shaft, said second ratio gear being in rotatable engagement with said first ratio gear;
  (vi) a first propeller blade drive shaft which extends upward from said transmission housing, said first propeller blade drive shaft being connected to the first of said pair of counter rotating propeller blades;
  (vii) a second propeller blade drive shaft which extends downward from said transmission housing, said second propeller blade drive shaft being connected to the second of said pair of counter rotating propeller blades;
  (viii) a first ring gear attached to an opposite end of said first propeller blade drive shaft within said transmission housing;
  (ix) a second ring gear attached to an opposite end of said second propeller blade drive shaft within said transmission housing; and
  (x) a pinion gear attached to an opposite end of said internal shaft, said pinion gear being sandwiched between said first and second ring gears, said pinion gear being in rotatable engagement with said first and second ring gears; and
 (f) a plurality of direction control vane assemblies mounted within said cylindrical shaped duct housing at a bottom end of said cylindrical shaped duct housing, said plurality of direction control vane assemblies controlling directional movement of said aerial vehicle is in a flight mode of operation, said plurality of direction control vane assemblies including:
  (i) first, second, third and fourth direction control vane assemblies configured to form a rectangle within said duct housing;
  (ii) fifth and sixth direction control vane assemblies positioned diagonally in alignment within said rectangle; and
  (iii) seventh and eighth direction control vane assemblies positioned diagonally in alignment within said rectangle, said seventh and eighth direction control vane assemblies being perpendicular to said fifth and sixth direction control vane assemblies;
 (g) a first wheel and axle assembly positioned at the rear end of said aerial vehicle, said first wheel and axle assembly including first and second drive wheels, the first drive wheel being rotatably mounted on one side of said of aerial vehicle and the second drive wheel being rotatably mounted on an opposite side of said aerial vehicle;
 (h) a gasoline engine and transmission assembly operatively connected to said first wheel and axle assembly to provide power to said first and second drive wheels rotating said first and second drive wheels when said aerial vehicle is in a ground based mode of operation;
 (i) a second wheel and axle assembly positioned at a front end of said aerial vehicle, said second wheel and axle assembly including first and second steerable wheels, the first steerable wheel being rotatably mounted on the one side of said of aerial vehicle and the second steerable wheel being rotatably mounted on the opposite side of said aerial vehicle; and
 (j) a steering wheel mounted within a cockpit located in proximity to the front end of said aerial vehicle, said steering wheel being operatively connected to said second wheel and axle assembly to allow a user of said aerial vehicle to steer said first and second steerable wheels and maneuver said aerial vehicle on a roadway when said aerial vehicle is in said ground based mode of operation.

15. The aerial vehicle of claim 14 further comprising a rotor pitch control assembly for rotating said pair of counter rotating propeller blades in a counterclockwise direction angling said pair of counter rotating propeller propeller blades, said rotor pitch control assembly including:
- a first swash plate slidably mounted on said first propeller blade drive shaft;
- a second swash plate slidably mounted on said second propeller blade drive shaft;
- each of said first and second swash plates including a plurality of roller bearings which allow for substantially frictionless movement of said first swash plate on said first propeller blade drive shaft and said second swash plate on said second propeller blade drive shaft;
- a plurality of colotor rods, each of said colotor rods having one end connected to said first swash plate and an opposite end connected to said second swash plate;
- a first plurality of pitch links, each of said first plurality of pitch links having one end connected to said first swash plate and an opposite end connected to the first of said pair of counter rotating propeller blades;
- a second plurality of pitch links, each of said second plurality of pitch links having one end connected to said second swash plate and an opposite end connected to the second of said pair of counter rotating propeller blades; and
- a collective pitch control handle operatively connected to said rotor pitch control assembly, said collective pitch control assembly allowing a user to control a collective pitch for said-pair of counter rotating propeller blades by adjusting said collective pitch control handle which results in synchronous movement of said first swash plate on said first propeller blade drive shaft and said second swash plate on said second propeller blade drive shaft.

16. The aerial vehicle of claim 1 further comprising a cockpit positioned within the vehicle body of said aerial vehicle, said cockpit being located in front of said cylindrical shaped duct housing, said cockpit being adapted to accommodate three passengers.

17. The aerial vehicle of claim 8 further comprising a cockpit positioned within the vehicle body of said aerial vehicle, said cockpit being located in front of said cylindrical shaped duct housing, said cockpit being adapted to accommodate three passengers.

18. The aerial vehicle of claim 14 further comprising a cockpit positioned within the vehicle body of said aerial vehicle, said cockpit being located in front of said cylindrical shaped duct housing, said cockpit being adapted to accommodate three passengers.

* * * * *

UNITED STATES PATENT AND TRADEMARK OFFICE
CERTIFICATE OF CORRECTION

PATENT NO. : 6,457,670 B1
DATED : October 1, 2002
INVENTOR(S) : Nick Geranio and Robert McBride It is certified that error appears in the above-identified patent and that said Letters Patent is hereby corrected as shown below:

Title page,
Insert -- [74], *Attorney, Agent, or Firm*–David S. Kalmbaugh et al. --

Column 1,
Lines 6-9, Insert -- The invention described herein may be manufactured and used by or for the Government of the United States of America for Government purposes without the payment of any royalties thereon or therefore. --

Signed and Sealed this

Twenty-second Day of July, 2003

JAMES E. ROGAN
*Director of the United States Patent and Trademark Office*